United States Patent
Matsui et al.

(10) Patent No.: US 7,890,728 B2
(45) Date of Patent: Feb. 15, 2011

(54) MEMORY INTERFACE DEVICE, MEMORY INTERFACE METHOD AND MODEM DEVICE

(75) Inventors: Takayuki Matsui, Chiba (JP); Toshimasa Ike, Chiba (JP); Masahiro Noguchi, Chiba (JP); Fukuzo Watanabe, Tokyo (JP)

(73) Assignees: Seiko Instruments Inc. (JP); Vodafone K.K. (JP)

( * ) Notice: Subject to any disclaimer, the term of this patent is extended or adjusted under 35 U.S.C. 154(b) by 604 days.

(21) Appl. No.: 10/585,751

(22) PCT Filed: Jan. 5, 2005

(86) PCT No.: PCT/JP2005/000011

§ 371 (c)(1),
(2), (4) Date: Nov. 30, 2006

(87) PCT Pub. No.: WO2005/069152

PCT Pub. Date: Jul. 28, 2005

(65) Prior Publication Data

US 2007/0160037 A1    Jul. 12, 2007

(30) Foreign Application Priority Data

Jan. 13, 2004    (JP) .............................. 2004-004960

(51) Int. Cl.
    *G06F 12/06* (2006.01)
(52) U.S. Cl. ................ 711/167; 711/154; 711/E12.078
(58) Field of Classification Search ........................ None
    See application file for complete search history.

(56) References Cited

U.S. PATENT DOCUMENTS

| 5,084,841 | A | | 1/1992 | Williams et al. ........ 365/189.07 |
| 5,278,956 | A | | 1/1994 | Thomsen et al. ............ 395/250 |
| 5,768,617 | A | * | 6/1998 | Liu .............................. 710/5 |
| 5,778,420 | A | | 7/1998 | Shitara et al. ............... 711/113 |

(Continued)

FOREIGN PATENT DOCUMENTS

JP        08234920        9/1996

(Continued)

*Primary Examiner*—Matt Kim
*Assistant Examiner*—Ryan Dare
(74) *Attorney, Agent, or Firm*—Adams & Wilks

(57) ABSTRACT

A memory interface device has a write detection section that detects the write of a predetermined unit amount of data by a memory write unit into a memory. A signal generation section generates a signal to notify the memory write unit that readout of data from the memory by a memory readout unit has been completed. A data storage amount measurement device measures an amount of data stored in the memory during the memory write procedures. A memory readout control section generates an interrupt signal with respect to the memory readout unit when the stored data amount in the memory reaches a predetermined readout start storage amount. A timer counts a period in which writing of the predetermined unit amount of the data into the memory by the memory write unit is discontinued and outputs a timeout signal to the memory readout control section when a value of the period count reaches a predetermined timer period. The memory readout control section generates the interrupt signal with respect to the memory readout unit even when the memory readout control section receives the timeout signal output from the timer.

8 Claims, 8 Drawing Sheets

U.S. PATENT DOCUMENTS

| | | |
|---|---|---|
| 6,384,634 B1 | 5/2002 | Brissette et al. ............... 326/93 |
| 6,415,363 B1 * | 7/2002 | Benayoun et al. ........... 711/154 |
| 6,553,448 B1 * | 4/2003 | Mannion ....................... 711/2 |
| 6,836,809 B2 * | 12/2004 | Bace ........................... 710/57 |
| 2001/0052038 A1 * | 12/2001 | Fallon et al. .................. 710/68 |
| 2003/0046510 A1 * | 3/2003 | North ......................... 711/203 |

FOREIGN PATENT DOCUMENTS

| | | |
|---|---|---|
| JP | 10106143 | 4/1998 |
| JP | 2002082901 | 3/2002 |

\* cited by examiner

MEMORY INTERFACE DEVICE, MEMORY INTERFACE METHOD AND MODEM DEVICE

Cross-Reference to Related Applications

This application is a U.S. national stage application of copending International Application No. PCT/JP2005/000011, filed Jan. 5, 2005, claiming an earliest priority date of Jan. 13, 2004, and published in the non-English language.

TECHNICAL FIELD

The present invention relates to a memory interface device, a memory interface method, and a modem device.

BACKGROUND ART

Heretofore, there is a card type electronic device referred to as a PC card, and there is realized the device equipped with various types of functions for expansion of a function of a portable personal computer or the like. There are a communication card, a memory card and the like of a modem, an LAN, a radio telephone and the like. These PC cards are used by being attached to a host device (e.g., the portable personal computer).

The PC card includes: a first in first out (FIFO) memory as a buffer in transmitting and receiving data between the card and a CPU of the host device; and an interface circuit which controls an access to this FIFO memory. Moreover, a data communication speed can be matched between the card and the CPU of the host device via the FIFO memory.

In a conventional procedure in a case where data is sent from the host device to the PC card via the above FIFO memory, first the host device divides transmission data into a certain amount (e.g., 16 bytes) of the data, and one of the divided data is written into the FIFO memory. Next, when this write is detected, the interface circuit of the FIFO memory generates an interrupt signal in order to notify the CPU of the PC card that there is the data in the FIFO memory. Next, in this interrupt processing, the CPU of the PC card reads data from the FIFO memory. Next, when this read is detected, the interface circuit of the FIFO memory outputs a readout completion notice signal to the host device. In response to this readout completion notice, the CPU of the host device writes the next data into the FIFO memory, if any.

As described above, heretofore, the host device divides the transmission data into the certain amount of the data, and repeats the above procedure every divided data to thereby transmit the data to the PC card.

Moreover, to reduce a load on the CPU in reading the data from the FIFO memory, an FIFO memory provided with a count function is known which generates the interrupt signal in a case where the amount of the data stored in the FIFO memory reaches a predetermined amount (see, e.g. Patent Document 1).

[Patent Document 1] Japanese Patent Application Laid-Open No. 6-325565 (Page 2, FIG. 1)

In recent years, in the FIFO memory mounted on the PC card, capacity enlargement is possible. Accordingly, when the amount of the data to be sent from the host device to the PC card once is increased in accordance with the maximum storage capacity of the FIFO memory, the number of the divided transmission number decreases. Therefore, it is possible to reduce the number of generated interrupt times with respect to the CPU of the PC card. Moreover, it is possible to increase the amount of the data to be handled in one interrupt processing. Therefore, the loads due to the interrupt processing are reduced, and the data can integrally be processed efficiently. Owing to these factors and the like, a processing speed can be enhanced.

However, for this purpose, the existing communication control program to be executed by the CPU of the host device needs to be changed to adapt the amount of the data to be sent from the host device to the PC card once in accordance with the new FIFO memory. Every time the FIFO memory to be mounted on the PC card is version-upgraded, the communication control program for the host device is changed in accordance with the new FIFO memory. This is a factor for cost increase, and additionally factors for defects such as bugs are increased. For such a reason, there is a demand for diversion of the existing communication control program for the host device.

For the similar reason, as to the above FIFO memory provided with the count function, unless the communication control program for the host device is changed, the effect of the memory cannot be obtained, and therefore the memory is not easily applied.

DISCLOSURE OF THE INVENTION

The present invention has been developed in consideration of such situations, and an object is to provide a memory interface device and a memory interface method capable of coping with a memory write procedure in which every time data is written into a memory every predetermined amount unit, it is confirmed that readout of the data from the memory has been completed, and then the next write of the data into the memory is performed, whereby a load on a CPU on a memory readout side can be reduced.

To solve the above problem, in the present invention, there is provided a memory interface device to control a memory access with respect to: a memory write unit to comply with a memory write procedure in which every time data is written into a memory every predetermined amount unit, it is confirmed that readout of the data from the memory has been completed, and then the next write of the data into the memory is performed; and a memory readout unit which reads the data from the memory, the memory interface device comprising: write detection means for detecting the write of the predetermined amount unit of the data from the memory write unit into the memory; signal generation means for generating a signal to notify the memory write unit that the readout of the data from the memory has been completed, in a case where the write of the predetermined amount unit of the data is detected; data storage amount measurement means for measuring an amount of the data stored in the memory; and memory readout control means for generating an interrupt signal with respect to the memory readout unit, in a case where the stored data amount in the memory reaches a predetermined readout start storage amount.

According to this constitution, every time the predetermined amount unit of the data is written from the memory write unit, the readout completion notice signal is generated. Therefore, it is possible to cope with the memory write procedure in the memory write unit. Furthermore, the predetermined amount of the data or more due to the memory write procedure is stored in the memory, and the written data can integrally be read from the memory write unit. Therefore, it is possible to reduce the number of generated interrupt times with respect to the memory readout unit. Moreover, the amount of the data to be handled in one interrupt processing by the memory readout unit can be increased to efficiently process the data, and loads on the memory readout unit are reduced.

In the present invention, there is provided a memory interface device connected to a memory write unit to comply with a memory write procedure in which every time data is written into a memory every predetermined amount unit, it is confirmed that readout of the data from the memory has been completed, and then the next write of the data into the memory is performed, the memory interface device being configured to control a memory access to the memory write unit, the memory interface device comprising: write detection means for detecting the write of the predetermined amount unit of the data from the memory write unit into the memory; signal generation means for generating a signal to notify the memory write unit that the readout of the data from the memory has been completed, in a case where the write of the predetermined amount unit of the data is detected; data storage amount measurement means for measuring an amount of the data stored in the memory; data processing means for reading the data from the memory to subject the data to predetermined processing; and memory readout control means for generating an interrupt signal with respect to the data processing means, in a case where the stored data amount in the memory reaches a predetermined readout start storage amount.

According to this constitution, every time the predetermined amount unit of the data is written from the memory write unit, the readout completion notice signal is generated. Therefore, it is possible to cope with the memory write procedure in the memory write unit. Furthermore, the predetermined amount of the data or more due to the memory write procedure is stored in the memory, and the data written from the memory write unit can integrally be read. Therefore, it is possible to reduce the number of generated interrupt times with respect to the memory readout unit or the data processing means. Moreover, the amount of the data to be handled in one interrupt processing by the memory readout unit or the data processing means can be increased to efficiently process the data, and loads on the memory readout unit and the data processing means are reduced.

Moreover, in the memory interface device of the present invention, the memory readout control means temporarily stops the signal generation by the signal generation means, in a case where the stored data amount in the memory reaches the predetermined readout start storage amount.

According to this constitution, it is judged that any data is not stored in the memory to stop the data write with respect to the memory write unit which is writing the data, and it is possible to prevent the data from being written over the maximum storage capacity of the memory.

Furthermore, the memory interface device of the present invention further comprises: a timer to count a period in which the write of the predetermined amount unit of the data is discontinued, when this counted value reaches a predetermined timer period, the timer being configured to output a timeout signal to the memory readout control means. The memory readout control means generates the interrupt signal with respect to the memory readout unit, even in a case where the timeout signal is received.

According to this constitution, it is possible to cope with a case where the total write data amount of the memory write unit is less than the readout start storage amount, and without storing the data up to the readout start storage amount in the memory, the write of the data from the memory write unit is ended.

In the present invention, there is provided a memory interface method to control a memory access with respect to: a memory write unit to comply with a memory write procedure in which every time data is written into a memory every predetermined amount unit, it is confirmed that readout of the data from the memory has been completed, and then the next write of the data into the memory is performed; and a memory readout unit which reads the data from the memory, the memory interface method comprising: a step of detecting the write of the predetermined amount unit of the data from the memory write unit into the memory; a step of notifying the memory write unit that the readout of the data from the memory has been completed, in a case where the write of the predetermined amount unit of the data is detected; a step of measuring an amount of the data stored in the memory; and a step of generating an interrupt signal with respect to the memory readout unit, in a case where the stored data amount in the memory reaches a predetermined readout start storage amount.

Moreover, the memory interface method of the present invention further includes: a step of temporarily stopping the readout completion notice, in a case where the stored data amount in the memory reaches the predetermined readout start storage amount.

Furthermore, the memory interface method of the present invention further includes: a step of counting a period in which the write of the predetermined amount unit of the data is discontinued; and a step of generating the interrupt signal with respect to the memory readout unit, in a case where this counted value reaches a predetermined timer period.

In the present invention, there is provided a memory interface device to control a memory access with respect to: a first memory write and readout unit to comply with a memory write procedure in which every time data is written into a memory every predetermined amount unit, it is confirmed that readout of the data from the memory has been completed, and then the next write of the data into the memory is performed; and a second memory write and readout unit which writes and reads the data with respect to the memory, the memory interface device comprising: write detection means for detecting the write of the predetermined amount unit of the data from the first memory write and readout unit into the memory; first completion signal generation means for generating a signal to notify the first memory write and readout unit that the readout of the data from the memory has been completed, in a case where the write of the predetermined amount unit of the data is detected; first data storage amount measurement means for measuring an amount of the data stored in the memory; first memory readout control means for generating an interrupt signal with respect to the second memory write and readout unit, in a case where the stored data amount in the memory reaches a predetermined readout start storage amount; write amount detection means for detecting the write of the predetermined amount of the data from the second memory write and readout unit into the memory; second completion signal generation means for generating a signal to notify the first memory write and readout unit that the write of the data into the memory has been completed, in a case where the write of the predetermined amount unit of the data is detected; second data storage amount measurement means for measurement the stored data amount in the memory; and second memory readout control means for generating an interrupt signal with respect to the second memory write and readout unit, in a case where the stored data amount in the memory reaches a predetermined readout completion storage amount.

According to this constitution, the readout completion notice signal is generated every time the predetermined amount unit of the data is written from the first memory write and readout unit. Therefore, it is possible to cope with the memory write procedure in the memory write and readout unit. Furthermore, the predetermined amount of the data or more due to the memory write procedure is stored in the memory, and the written data can integrally be read from the memory write and readout unit. Therefore, it is possible to reduce the number of generated interrupt times with respect to the second memory write and readout unit. Moreover, the amount of the data to be handled in one interrupt processing by the memory write and readout unit can be increased to efficiently process the data.

Moreover, after the predetermined amount unit of the data is written from the second memory write and readout unit, the write completion notice signal is generated with respect to the first memory write and readout unit. Therefore, the data written from the second memory write and readout unit can be read integrally and processed efficiently. Accordingly, the loads on the first and second memory write and readout devices can be reduced.

Moreover, in the memory interface device of the present invention, the first memory readout control means temporarily stops the signal generation by the first completion signal generation means, in a case where the stored data amount in the memory reaches the predetermined readout start storage amount.

According to this constitution, it is judged that any data is not stored in the memory to stop the write of the data with respect to the memory write unit which is writing the data, and it is possible to prevent the data from being written over the maximum storage capacity of the memory.

Moreover, the memory interface device of the present invention further comprises: a first timer to count a period in which the write of the predetermined amount unit of the data is discontinued, when this counted value reaches a predetermined timer period, the timer being configured to output a timeout signal to the first memory readout control means. The first memory readout control means generates the interrupt signal with respect to the second memory write and readout unit, even in a case where the timeout signal is received.

According to this constitution, it is possible to cope with a case where the total write data amount of the first memory write and readout unit is less than the readout start storage amount, and without storing the data up to the readout start storage amount in the memory, the write of the data from the first memory write and readout unit is ended.

Moreover, the memory interface device of the present invention further comprises: a second timer to count a period in which the write of the data from the second memory write and readout unit into the memory is discontinued, when this counted value reaches a predetermined timer period, the second timer being configured to output a timeout signal to the second completion signal generation means. The second completion signal generation means generates a completion notice signal with respect to the first memory write and readout unit, in a case where the timeout signal is received.

According to this constitution, it is possible to cope with a case where the total write data amount of the second memory write and readout unit is less than a write completion storage amount, and without storing the data up to the write completion storage amount in the memory, the write of the data from the second memory write and readout unit is ended.

According to the present invention, there is provided a memory interface method to control a memory access with respect to: a first memory write and readout unit to comply with a memory write procedure in which every time data is written into a memory every predetermined amount unit, it is confirmed that readout of the data from the memory has been completed, and then the next write of the data into the memory is performed; and a second memory write and readout unit which writes and reads the data with respect to the memory, the memory interface method including: a step of detecting the write of the predetermined amount unit of the data from the memory write unit into the memory; a step of notifying the first memory write and readout unit that the readout of the data from the memory has been completed, in a case where the write of the predetermined amount unit of the data is detected; a step of measuring an amount of the data stored in the memory; a step of generating an interrupt signal with respect to the memory readout unit, in a case where the stored data amount in the memory reaches a predetermined readout start storage amount; a step of detecting the write of the predetermined amount of the data from the second memory write and readout unit into the memory; a step of generating a signal to notify the first memory write and readout unit that the write of the data into the memory has been completed, in a case where the write of the predetermined amount of the data is detected; a step of measuring the stored data amount in the memory; and a step of generating an interrupt signal with respect to the second memory write and readout unit, in a case where the stored data amount in the memory reaches a predetermined readout completion storage amount.

Moreover, the memory interface method of the present invention further includes: a step of temporarily stopping the readout completion notice, in a case where the stored data amount in the memory reaches the predetermined readout start storage amount.

Furthermore, the memory interface method of the present invention further includes: a step of counting a period in which the write of the predetermined amount unit of the data is discontinued; and a step of generating the interrupt signal with respect to the second memory write and readout unit, in a case where this counted value reaches a predetermined timer period.

In addition, the memory interface method of the present invention further includes: a step of counting a period in which the write of the data from the second memory write and readout unit into the memory is discontinued; a step of outputting a timeout signal, when this counted value reaches the predetermined timer period; and a step of outputting a completion signal to the first memory write and readout unit in response to the timeout signal.

In the present invention, there is provided a modem device connected to a data processing unit to comply with a memory write procedure in which every time communication data or control command data is written into a memory every predetermined amount unit, it is confirmed that readout of the data from the memory has been completed, and then the next write of the data into the memory is performed, the modem device comprising: a modem interface which exchanges the data with respect to the data processing unit; the memory; a memory readout unit which reads the data from the memory; and communication means connected to the memory readout unit to transmit and receive the communication data, the modem device further comprising: write detection means for detecting the write of the predetermined amount unit of the data from the memory write unit into the memory; signal generation means for generating a signal to notify the data processing unit that the readout of the data from the memory has been completed, in a case where the write of the predetermined amount unit of the data is detected; data storage amount measurement means for measuring an amount of the data stored in the memory; and memory readout control means for generating an interrupt signal with respect to the memory readout unit, in a case where the stored data amount in the memory reaches a predetermined readout start storage amount.

Moreover, in the present invention, there is provided a modem device connected to a data processing unit to comply with a memory write procedure in which every time communication data or control command data is written into a memory every predetermined amount unit, it is confirmed that readout of the data from the memory has been completed, and then the next write of the data into the memory is performed, the modem device comprising: a modem interface which exchanges the data with respect to the data processing unit; the memory; a memory write and readout unit which writes and reads the data with respect to the memory; and communication means connected to the memory write and readout unit to transmit and receive the communication data, the modem device further comprising: write detection means for detecting the write of the predetermined amount unit of the data from the memory write and readout unit into the memory; first completion signal generation means for generating a signal to notify the data processing unit that the readout of the data from the memory has been completed, in a case where the write of the predetermined amount unit of the data is detected; first data storage amount measurement means for measuring an amount of the data stored in the memory; first memory readout control means for generating an interrupt signal with respect to the memory write and readout unit, in a case where the stored data amount in the memory reaches a predetermined readout start storage amount; write amount detection means for detecting the write of the predetermined amount of the data from the memory write and readout unit into the memory; second completion signal generation means for generating a signal to notify the data processing unit that the write of the data into the memory has been completed, in a case where the write of the predetermined amount of the data is detected; second data storage amount measurement means for measurement the stored data amount in the memory; and second memory readout control means for generating an interrupt signal with respect to second memory write and readout unit, in a case where the stored data amount in the memory reaches a predetermined readout completion storage amount.

BEST MODE FOR CARRYING OUT THE INVENTION

One embodiment of the present invention will be described hereinafter with reference to the drawings. In the present embodiment, there will be described as an example a case where a memory interface device is mounted on a card type electronic device referred to as a PC card.

Figure 1:
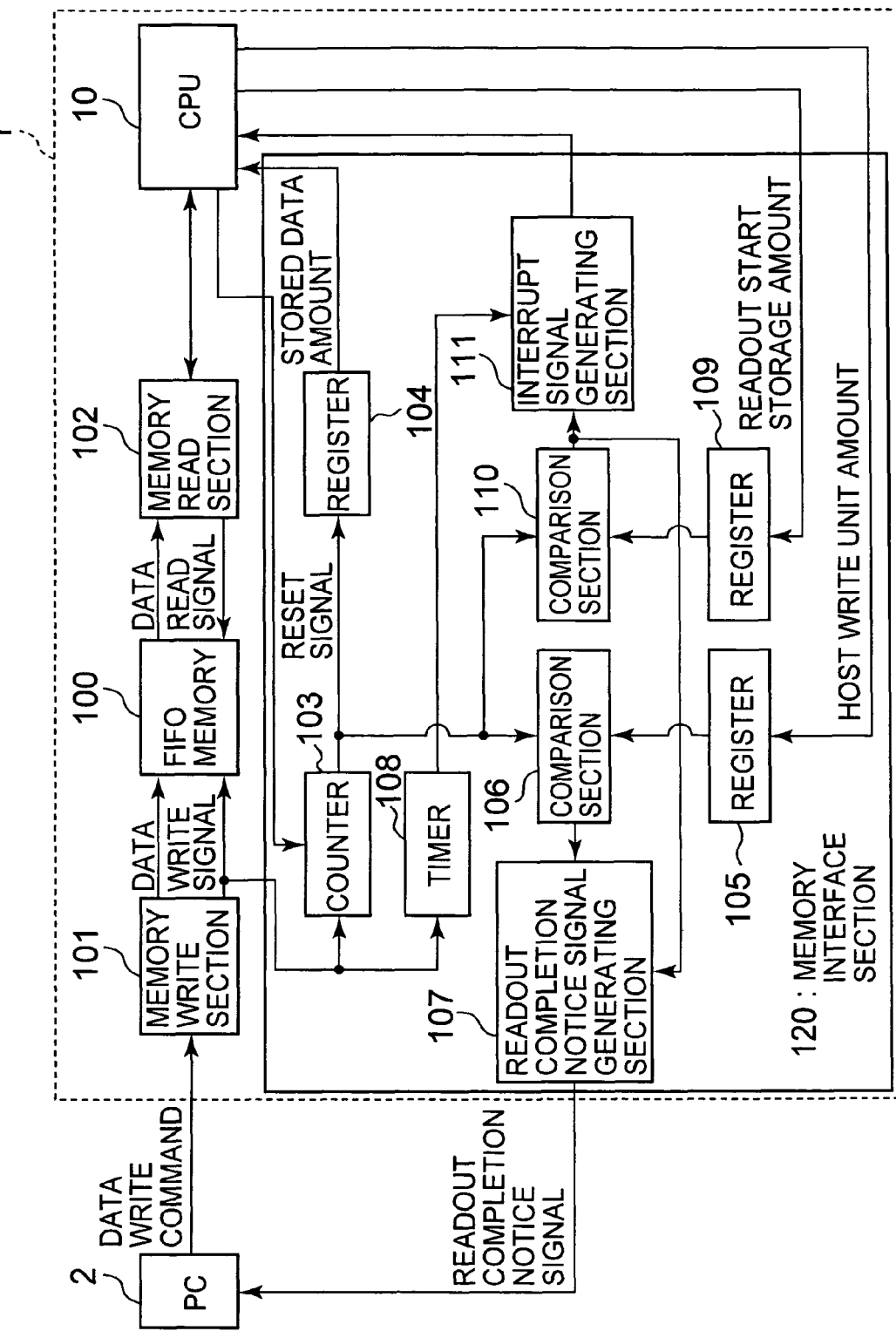
FIG. 1 is a block diagram showing a constitution of a PC card 1 equipped with a memory interface device in one embodiment of the present invention.
Figure 2:
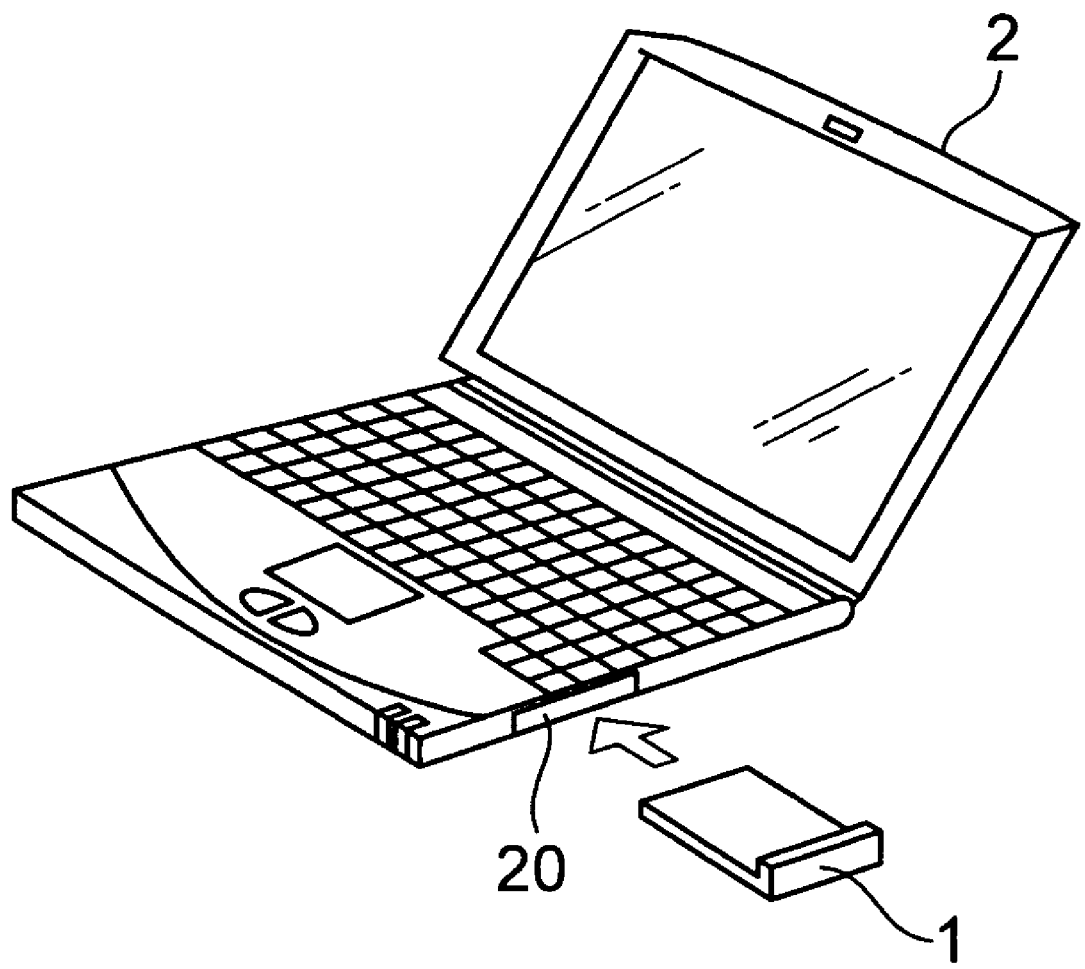
FIG. 2 is an appearance diagram of the PC card 1 shown in FIG. 1 and a portable personal computer 2 to which the card is to attached.

FIG. 1 is a block diagram showing a constitution of a PC card 1 equipped with a memory interface device in one embodiment of the present invention. FIG. 2 is an appearance diagram of the PC card 1 and a portable personal computer (hereinafter simply referred to as the PC) 2 to which the PC card 1 is to attached.

As shown in FIG. 2, the PC card 1 can be attached to a PC card slot 20 of the PC 2. Moreover, FIG. 1 shows only one form for sending data from a CPU (not shown) of the PC 2 to a CPU 10 of the PC card 1 in a case where the PC card 1 is attached to the PC 2, and other forms are omitted for convenience of description only.

In the PC card 1 of FIG. 1, an FIFO memory 100 functions as a buffer at a time when data is received from the CPU of the PC 2.

The CPU of the PC 2 receives and transfers the data with respect to the CPU 10 of the PC card 1 via this FIFO memory 100. Here, there will be described a memory write procedure in the PC 2. First, the CPU of the PC 2 divides transmission data into a certain amount of the data. Moreover, every time the predetermined amount unit of the data is written into the FIFO memory 100, it is confirmed that the readout of the data from the FIFO memory 100 has been completed, and then the next write of the data into the FIFO memory 100 is performed. On receiving a readout completion notice signal (see FIG. 1) from the PC card 1, the CPU of the PC 2 judges that the readout of the data from the FIFO memory 100 has been completed.

In the PC card 1 of FIG. 1, on receiving data and a write command from the PC 2, a memory write section 101 outputs a write signal to write the received data with respect to the FIFO memory 100.

On receiving a data readout instruction from the CPU 10, a memory read section 102 outputs a read signal to the FIFO memory 100 to read out the data, and outputs the read data to the CPU 10.

A counter 103 counts a write signal to the FIFO memory 100. This counted value indicates a stored data amount in the FIFO memory 100. For example, in a case where a write signal is output in a byte unit, the counted value of the counter 103 indicates the stored data amount in the FIFO memory 100 by the unit of the byte. The counter 103 sets the counted value to zero in response to a reset signal from the CPU 10. This reset signal is output at a time when the CPU 10 reads out all of the stored data from the FIFO memory 100 via the memory read section 102.

A register 104 holds the counted value of the counter 103, that is, the stored data amount in the FIFO memory 100. The held value of this register 104 is readable from the CPU 10. This register 104 allows the CPU 10 to acquire the stored data amount in the FIFO memory 100.

A register 105 holds a data write unit amount (host write unit amount) into the FIFO memory 100 in the memory write procedure in the above PC 2. This host write unit amount can be set to an arbitrary value by the CPU 10.

A comparison unit 106 compares the counted value of the counter 103, that is, the stored data amount in the FIFO memory 100 with the held value of the register 105, that is, the host write unit amount. Moreover, in a case where both of the amounts agree with each other, an agreement signal is output to a readout completion notice signal generating section 107.

On receiving the agreement signal from the comparison unit 106, the readout completion notice signal generating section 107 generates a readout completion notice signal to output the signal to the PC 2. That is, in a case where the write of the data into the FIFO memory 100 by the PC 2 every predetermined amount unit described above has been detected, the readout completion notice signal is generated. Accordingly, although the readout of the data from the FIFO memory 100 is not actually completed, the CPU of the PC 2 judges that the readout of the data from the FIFO memory 100 has been completed on receiving the readout completion notice signal, and performs the next data write into the FIFO memory 100. As a result, in the FIFO memory 100, the data is stored in excess of the predetermined amount of the above data write by the PC 2.

Moreover, the readout completion notice signal generating section 107 stops the readout completion notice signal from being generated in a period in which a stop signal described later is received.

A timer 108 counts a period in which a write signal to the FIFO memory 100 is discontinued. Moreover, when the counted value reaches a predetermined timer period (timeout time), a timeout signal is output to an interrupt signal generating section 111.

A register 109 holds a storage amount (readout start storage amount) indicating a readout start time of the data from the FIFO memory 100. This readout start storage amount can be set to an arbitrary value by the CPU 10. For example, the amount is set in accordance with a maximum storage capacity of the FIFO memory 100.

A comparison section 110 compares the counted value of the counter 103, that is, the stored data amount in the FIFO memory 100 with the held value of the register 109, that is, the readout start storage amount. Moreover, in a case where both of the amounts agree with each other, an agreement signal is output to the interrupt signal generating section 111.

Moreover, this agreement signal is a stop signal to the above readout completion notice signal generating section 107. That is, in a case where the stored data amount in the FIFO memory 100 reaches the readout start storage amount, the generation of the readout completion notice signal is stopped. Accordingly, with respect to the PC 2 which judges that any data is not stored in the FIFO memory 100 to write the data, the data write is stopped, and the data can be prevented from being written in excess of the maximum storage capacity of the FIFO memory 100.

In a case where the agreement signal is received from the FIFO memory 100, or the timeout signal is received from the timer 108, the interrupt signal generating section 111 generates the interrupt signal to output the signal to the CPU 10. On receiving this interrupt signal, the CPU 10 acquires the stored data amount from the register 104, and performs data readout operations via the memory read section 102, the number of the data readout operations corresponding to the stored data amount. Accordingly, the data stored in the FIFO memory 100 is all read out by the CPU 10. After the completion of the readout, the CPU 10 resets the counter 103.

It is to be noted that in the present embodiment, among the respective sections of the above PC card 1 of FIG. 1, a memory interface 120 includes the counter 103, the registers 104, 105 and 109, the comparison units 106, 110, the readout completion notice signal generating section 107, the timer 108 and the interrupt signal generating section 111.

Figure 3:
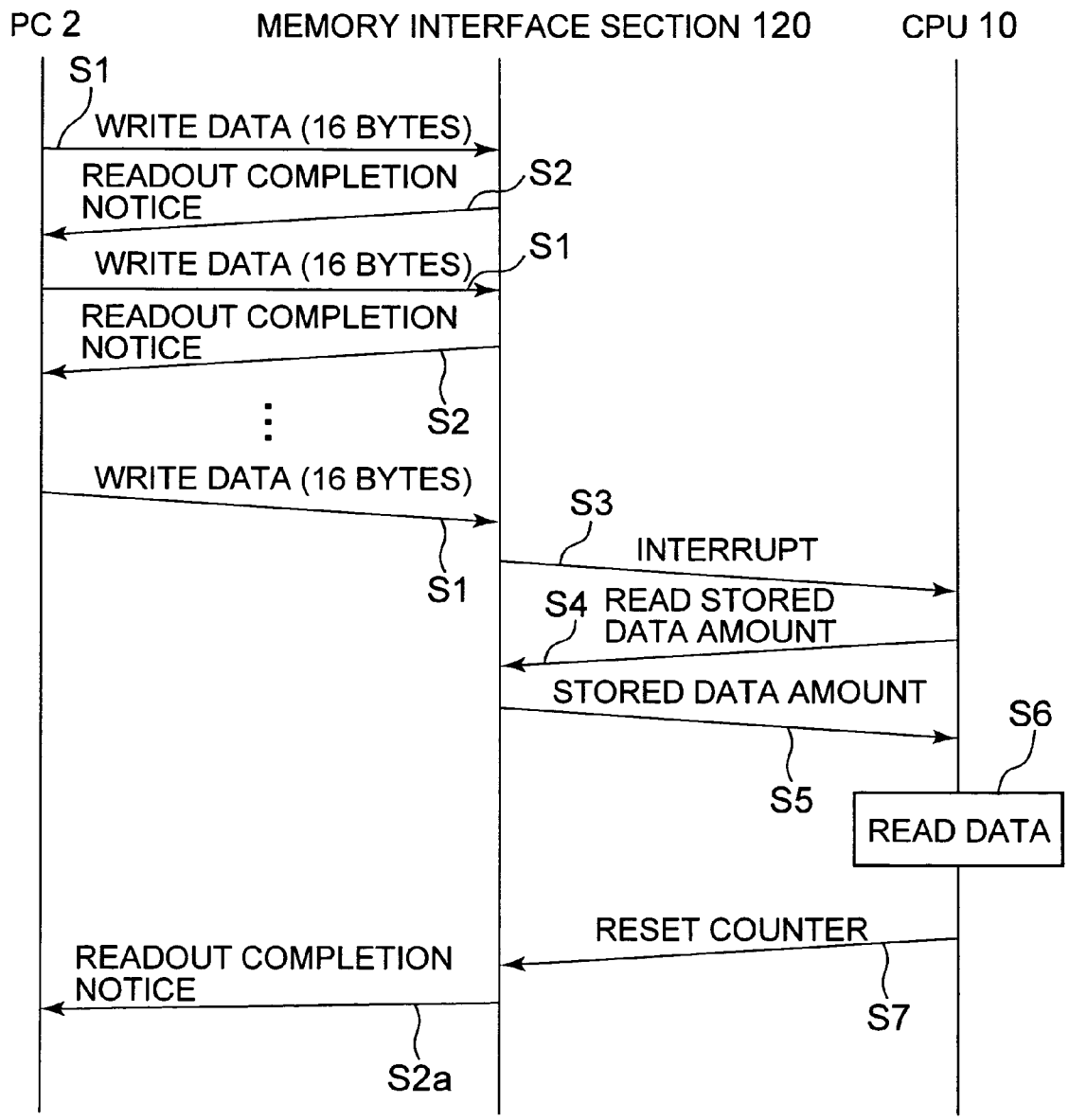
FIG. 3 is a first sequence chart showing a flow of memory interface processing in one embodiment of the present invention.
Figure 4:
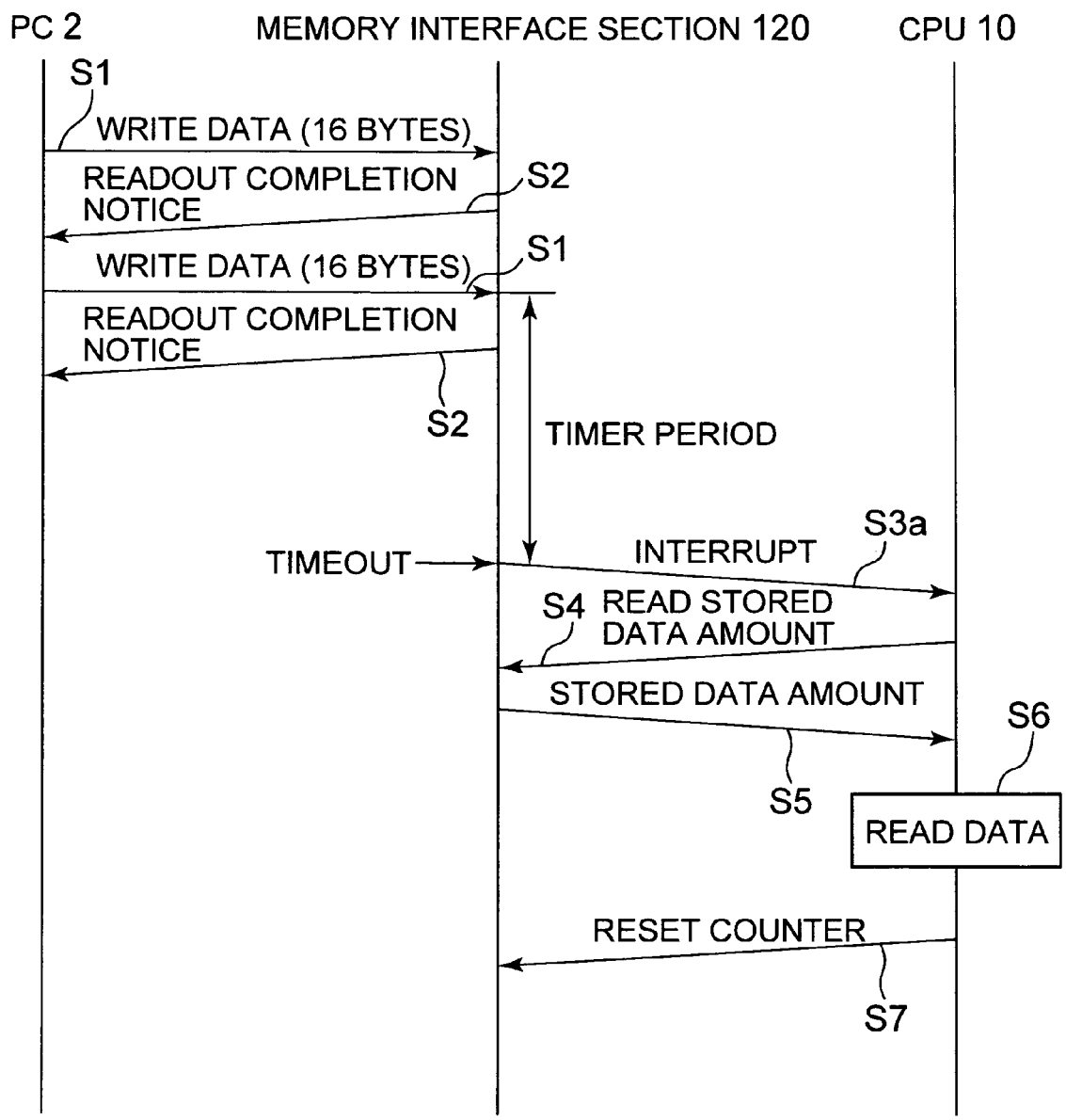
FIG. 4 is a second sequence chart showing a flow of memory interface processing in one embodiment of the present invention.

Next, there will be described an operation of the memory interface in the PC card 1 shown in FIG. 1 described above with reference to FIGS. 3 and 4. FIGS. 3 and 4 are first and second sequence charts showing a flow of memory interface processing in the present embodiment.

First, a first sequence will be described with reference to FIG. 3. This first sequence shows a case where the data is stored up to the readout start storage amount (e.g., the maximum storage capacity of the FIFO memory 100) in the FIFO memory 100. This corresponds to a case where a transmission data amount of the PC 2 is not less than the readout start storage amount.

In FIG. 3, the PC 2 writes the data into the FIFO memory 100 every predetermined amount unit (16-byte unit in the example of FIG. 3) (step S1). Every time the data is written, the memory interface section 120 of the PC card 1 generates the readout completion notice signal by the readout completion notice signal generating section 107 to output the signal to the PC 2 (step S2).

Subsequently, when the stored data amount in the FIFO memory 100 reaches the readout start storage amount held in the register 109, the memory interface section 120 generates the interrupt signal by the interrupt signal generating section 111, and outputs the signal to the CPU 10 (step S3). At this time, the stop signal from the comparison section 110 is input into the readout completion notice signal generating section 107, and the generation of the readout completion notice signal stops.

Subsequently, in response to the interruption, the CPU 10 reads out the stored data amount from the register 104 (steps S4, S5). Moreover, all the stored data is read out from the FIFO memory 100 based on the read data storage amount (step S6). When this readout is completed, the CPU 10 resets the counter 103 (step S7). When this counter is reset, the stop signal output from the comparison section 110 is cancelled, and the readout completion notice signal generating section 107 restarts the generation of the readout completion notice signal, and outputs the readout completion notice signal to the PC 2 (step S2a).

Next, a second sequence will be described with reference to FIG. 4. This second sequence indicates a case where without storing the data up to the readout start storage amount in the FIFO memory 100, the write of the data from the PC 2 ends. This corresponds to a case where the transmission data amount of the PC 2 is less than the readout start storage amount.

In FIG. 4, in the same manner as in FIG. 3 described above, the PC 2 writes the data into the FIFO memory 100 every predetermined amount unit. Every time the data is written, the memory interface section 120 of the PC card 1 generates the readout completion notice signal by the readout completion notice signal generating section 107, and outputs the signal to the PC 2 (steps S1, S2). At this time, the timer 108 is reset every time the data is written into the FIFO memory 100.

Next, after the write of the data from the PC 2 ends, the timer period expires, and the timer 108 times out. Then, the memory interface section 120 generates the interrupt signal by the interrupt signal generating section 111, and outputs the signal to the CPU 10 (step S3a). In response to this interruption, in the same manner as in FIG. 3 described above, the CPU 10 reads out all the stored data from the FIFO memory 100, and resets the counter 103 (steps S4 to S7).

As described above, according to the present embodiment, every time the predetermined amount unit of the data is written from the PC 2, the readout completion notice signal is generated. Therefore, it is possible to cope with the memory write procedure in the above PC 2, and the existing communication control program for the PC 2 (host device) can be diverted.

Furthermore, the predetermined amount of the data or more is stored in the FIFO memory 100 by the memory write procedure, and the data written from the PC 2 can integrally be read out. Therefore, it is possible to reduce the number of generated interrupt times with respect to the CPU 10 by the PC card 1, and it is possible to increase the amount of the data to be handled by the CPU 10 in one interrupt processing. As a result, loads due to the interrupt processing can be reduced, and the data can integrally be processed efficiently. In consequence, there is obtained an excellent effect that the loads on the CPU 10 of the PC card 1 are reduced, and a processing speed is enhanced.

Moreover, since the CPU 10 of the PC card 1 can grasp the stored data amount in the FIFO memory 100 to read out the data from the FIFO memory 100, the data processing can be performed as designed.

Figure 5:
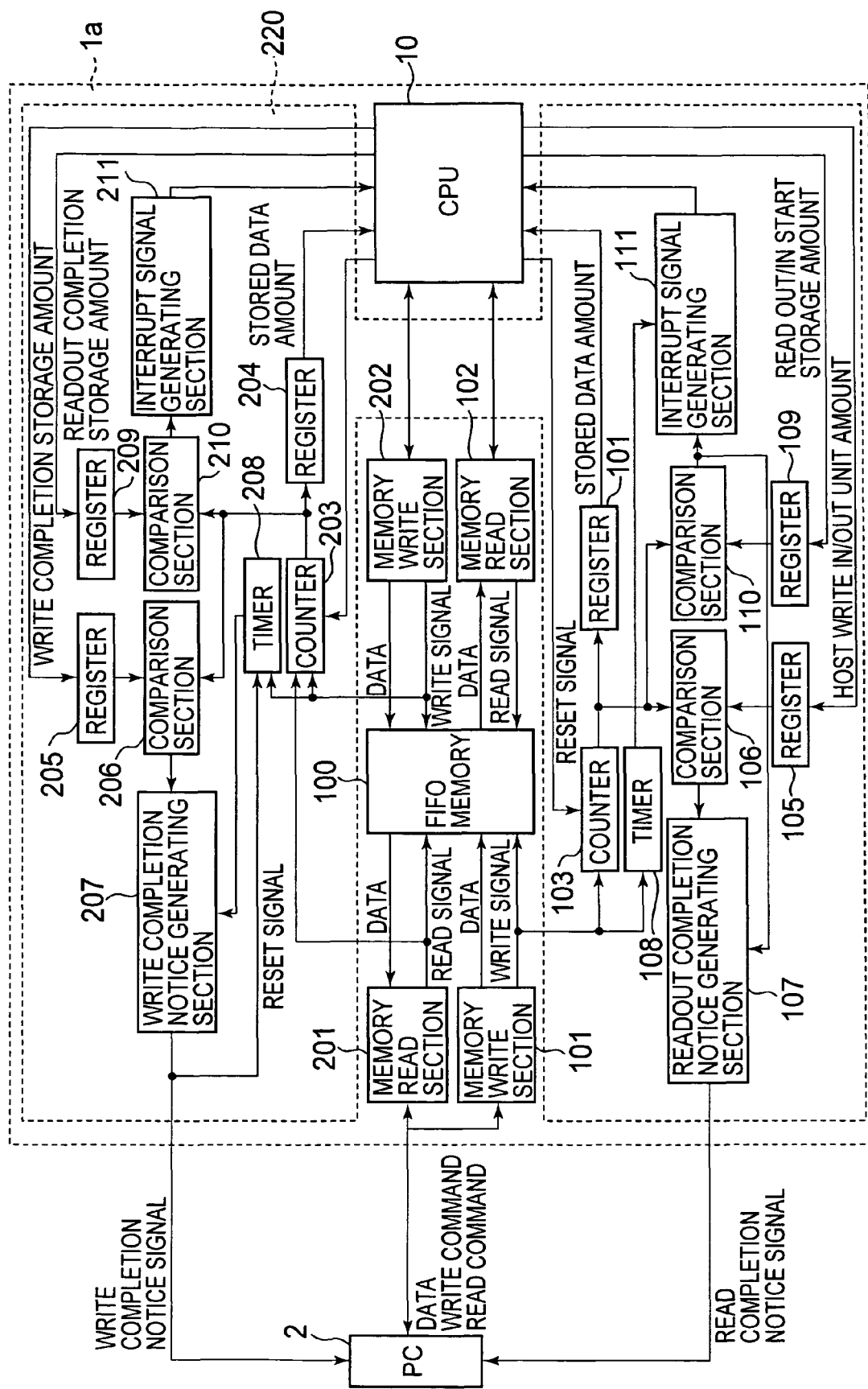
FIG. 5 is a block diagram showing a constitution of a PC card 1a equipped with a memory interface device in a second embodiment of the present invention.

Next, a second embodiment of the present invention will be described. The second embodiment has a constitution to cope with write of data from a PC card into a PC. FIG. 5 shows a constitution of a PC card 1a equipped with a memory interface device in the second embodiment of the present invention. Here, there is omitted description of a constitution or an operation similar to that of FIG. 1, that is, the write of the data from the PC to the PC card.

In the PC card 1a of FIG. 5, in the same manner as in FIG. 1, an FIFO memory 100 functions as a buffer in receiving the data from a CPU of a PC 2. Moreover, here, the memory also functions as a buffer in transmitting the data.

The CPU of the PC 2 receives and transfers the data with respect to a CPU 10 of the PC card 1a via this FIFO memory 100, and the CPU 10 of the PC card 1a receives and transfers the data with respect to the CPU of the PC 2 via the FIFO memory 100.

Next, there will be described a memory readout procedure in the PC 2. First, the CPU of the PC card 1a allows a memory write section 202 to output a write signal to the FIFO memory 100, and writes the data into the FIFO memory 100. A memory read section 201 receives a read command from the PC 2, and outputs a read signal to the FIFO memory 100, and the FIFO memory 100 transmits the data to the PC 2. On receiving a write completion notice signal (see FIG. 5) from the PC card 1a, the CPU of the PC 2 judges that a preparation for readout of the data from the FIFO memory 100 has been completed.

A counter 203 counts the write signal from the memory write section 202 into the FIFO memory 100, and the read signal from the memory read section 201 to the FIFO memory 100. The counter 203 counts up in response to the write signal from the memory write section 202 to the FIFO memory 100, and counts down in response to the read signal from the memory read section 201 to the FIFO memory 100. Accordingly, a counted value in the counter 203 indicates a stored data amount in the FIFO memory 100. This reset signal is output, when the counter is returned to an initial state during turning-on of a power source or the like.

A register 204 holds the counted value of the counter 203, that is, the stored data amount in the FIFO memory 100. The held value of this register 204 is readable from the CPU 10. This register 204 allows the CPU 10 to acquire the stored data amount in the FIFO memory 100.

A register 205 holds an amount which completes the data write from the CPU 10 into the FIFO memory 100. This write completion storage amount can be set to an arbitrary value by the CPU 10.

A comparison unit 206 compares the counted value of the counter 203, that is, the stored data amount in the FIFO memory 100 with the held value of the register 205, that is, the write completion storage amount. Moreover, in a case where both of the amounts agree with each other, an agreement signal is output to a write completion notice signal generating section 207.

On receiving the agreement signal from the comparison unit 206, the write completion notice signal generating section 207 generates a write start notice signal, and outputs the signal as an interrupt signal to the PC 2. That is, in a case where the write of the predetermined amount of the data by the CPU 10 into the FIFO memory 100 is detected, a write completion notice signal is generated. Accordingly, the CPU of the PC 2 starts readout of the data from the FIFO memory 100.

After the write signal from the memory write section 202 to the memory write section 101 is generated, a timer 208 counts a period in which the next write signal is discontinued. Moreover, when a counted value reaches a predetermined timer period (timeout time), a timeout signal is output to the write completion notice signal generating section 207.

On receiving the timeout signal from the timer 208, the write completion notice signal generating section 207 generates a write completion notice signal, and outputs the signal as an interrupt signal. That is, in a case where the write of the data by the CPU 10 into the FIFO memory 100 is detected, the write completion notice signal is generated. Accordingly, the CPU of the PC 2 starts the readout of the data from the FIFO memory 100. The write completion notice signal is input into the timer 208 to reset the timer 208.

A register 209 holds a storage amount (readout completion storage amount) by which the readout of the data from the FIFO memory 100 is completed. This readout completion storage amount can be set to an arbitrary value by the CPU 10, and is usually set to 0.

A comparison section 210 compares the counted value of the counter 103, that is, the stored data amount in the FIFO memory 100 with the held value of the register 209, that is, the readout completion storage amount. Moreover, in a case where both of the amounts agree with each other, an agreement signal is output to an interrupt signal generating section 211.

On receiving the agreement signal from the comparison section 210, the interrupt signal generating section 211 generates an interrupt signal to output the signal to the CPU 10. On receiving this interrupt signal, the CPU 10 is notified a possibility of the subsequent data write operation.

Figure 6:
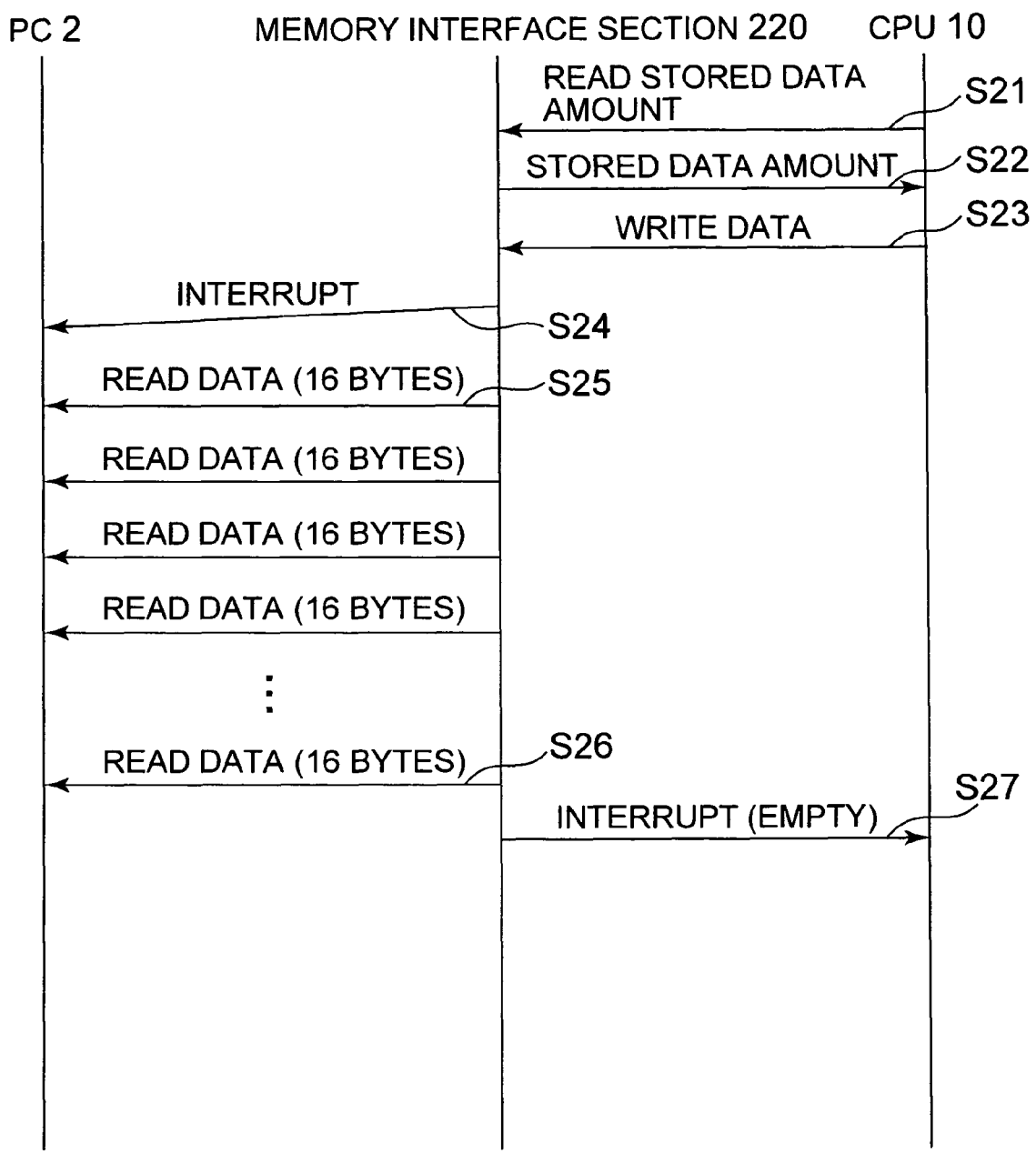
FIG. 6 is a first sequence chart showing a flow of memory interface processing in the second embodiment of the present invention.
Figure 7:
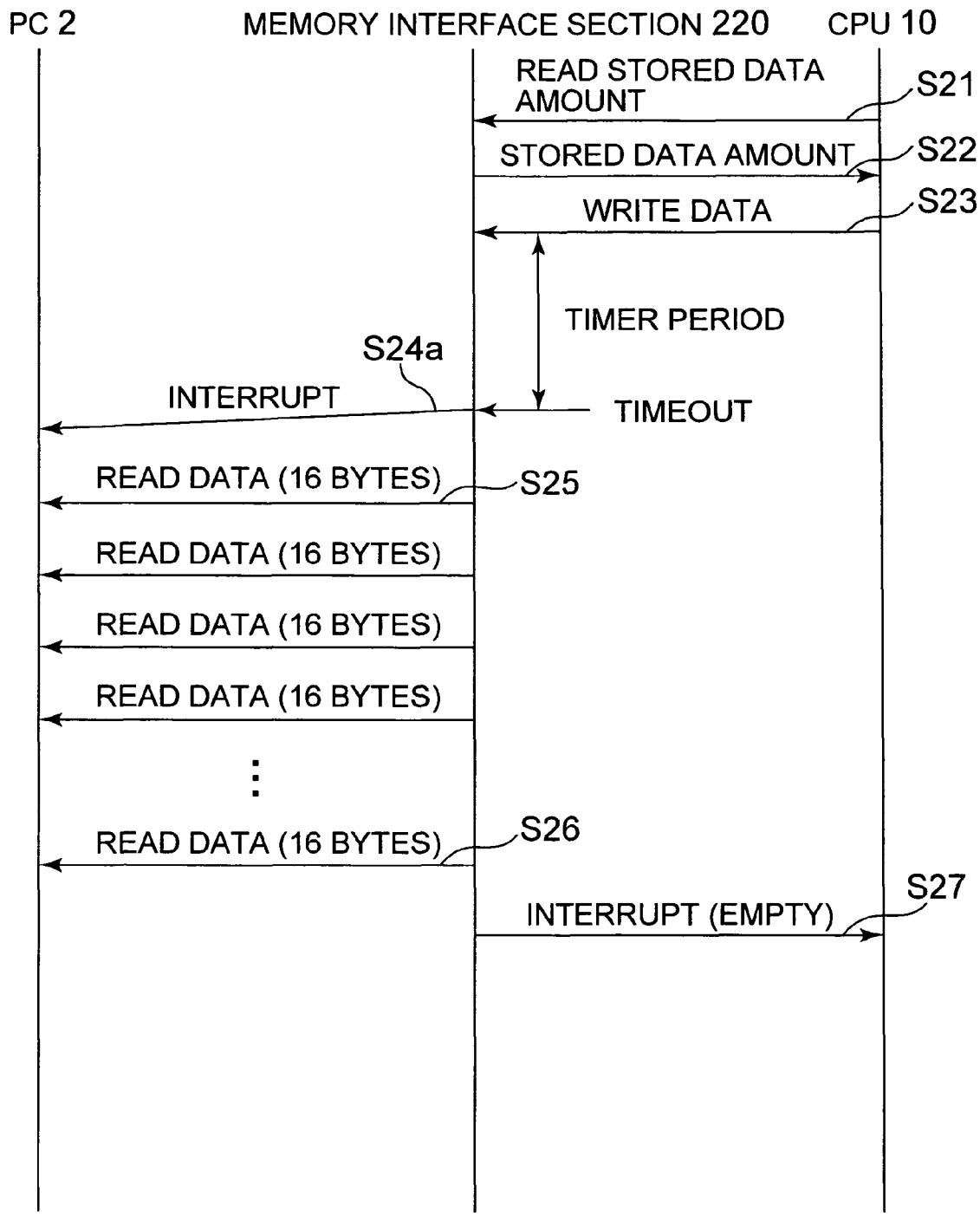
FIG. 7 is a second sequence chart showing a flow of memory interface processing in the second embodiment of the present invention.

Next, there will be described an operation at a time when the data is written from the PC card 1a into the PC 2 in an memory interface of the above PC card 1a shown in FIG. 1 with reference to FIGS. 6, 7. FIGS. 6, 7 are first and second sequence charts showing a flow of interface processing in the present embodiment.

First, the first sequence will be described with reference to FIG. 6. This first sequence corresponds to a case where the amount of the data to be written from the CPU 10 into the FIFO memory 100 is not less than a predetermined value.

In FIG. 6, the CPU 10 confirms the stored data amount stored at present in the FIFO memory 100 from contents of the register 204 (steps S21, S22). In accordance with the confirmed stored data amount, the CPU 10 writes the data into the FIFO memory 100 (step S23).

At this time, the write signal from the memory write section 202 increases the counted value of the counter 203.

Subsequently, when the stored data amount in the FIFO memory 100 reaches the write completion storage amount held in the register 205, the memory write section 202 outputs an interrupt signal which is the write completion notice signal from the write completion notice generating section to the PC 2 (step S24).

The PC 2 into which the interrupt signal has been input outputs a read command to the memory read section 201, and the memory read section 201 reads out the data from the FIFO memory 100 every predetermined unit (here, 16 bytes), and outputs the data to the PC 2 (step S25). At this time, the read signal from the memory read section 201 decreases the value of the counter 203.

As to the data output to the PC 2, the last data is distinguished by an added data status (step S26).

Moreover, the read signal from the memory read section 201 decreases the value of the counter 203, and the value of the counter 203 becomes equal to the readout completion storage amount of the register 209. That is, when it is judged that the readout from the FIFO memory 100 has been completed, the comparison section 210 outputs the interrupt signal to the interrupt signal generating section 211 to notify the possibility of a data write operation of the CPU 10 (step S27).

Next, the second sequence will be described with reference to FIG. 7. This second sequence copes with a case where the data to be written from the CPU 10 into the FIFO memory 100 is less than a predetermined value.

In FIG. 7, in the same manner as in FIG. 6 described above, the CPU 10 confirms the stored data amount stored at present in the FIFO memory 100 from the contents of the register 204 (steps S21, S22). In accordance with the confirmed stored data amount, the CPU 10 writes the data into the FIFO memory 100 (step S23).

Next, after the data write from the CPU 10 ends, in a case where the write completion storage amount does not reach the storage amount set to the register 205, a timer period expires, and the timer 208 times out. Accordingly, a memory interface section 220 allows the write completion notice signal generating section 207 to generate the interrupt signal, and outputs the signal to the PC 2 (step S24a). In response to this interruption, in the same manner as in FIG. 6 described above, the PC 2 reads out all the stored data from the FIFO memory 100 (steps S25 to S27).

As described above, according to the present embodiment, even in the write of the data from the PC card 1a into the PC 2, the stored data amount in the FIFO memory 100 can be grasped to write the data from the FIFO memory 100 into the PC 2. Therefore, the data can be processed as designed.

The embodiments of the present invention have been described above in detail with reference to the drawings, but a specific constitution is not limited to the embodiments, and the present invention includes design changes and the like without departing from the scope of the present invention.

For example, in the above embodiments, the FIFO memory has been used, but the present invention is applicable to a random access memory (RAM). For example, the memory write section 101 writes the data into the RAM in an ascending order from address 0, and the CPU 10 similarly reads out the data from the RAM in the ascending order from address 0.

Moreover, as a memory write unit as a control object of the memory interface device in the present invention, the portable personal computer has been described as an example, but the memory write unit is not limited to this. Similarly, a memory readout unit is not limited to the CPU of the PC card. That is, the memory interface device of the present invention can broadly be applied as a device to realize memory access control with respect to: the memory write unit which complies with the above memory write procedure; and the memory readout unit which reads out the data from the memory accessed by this memory write unit. The memory interface device of the present invention may include data processing means for reading the data from the memory accessed by the memory write unit to subject the read data to predetermined processing.

Figure 8:
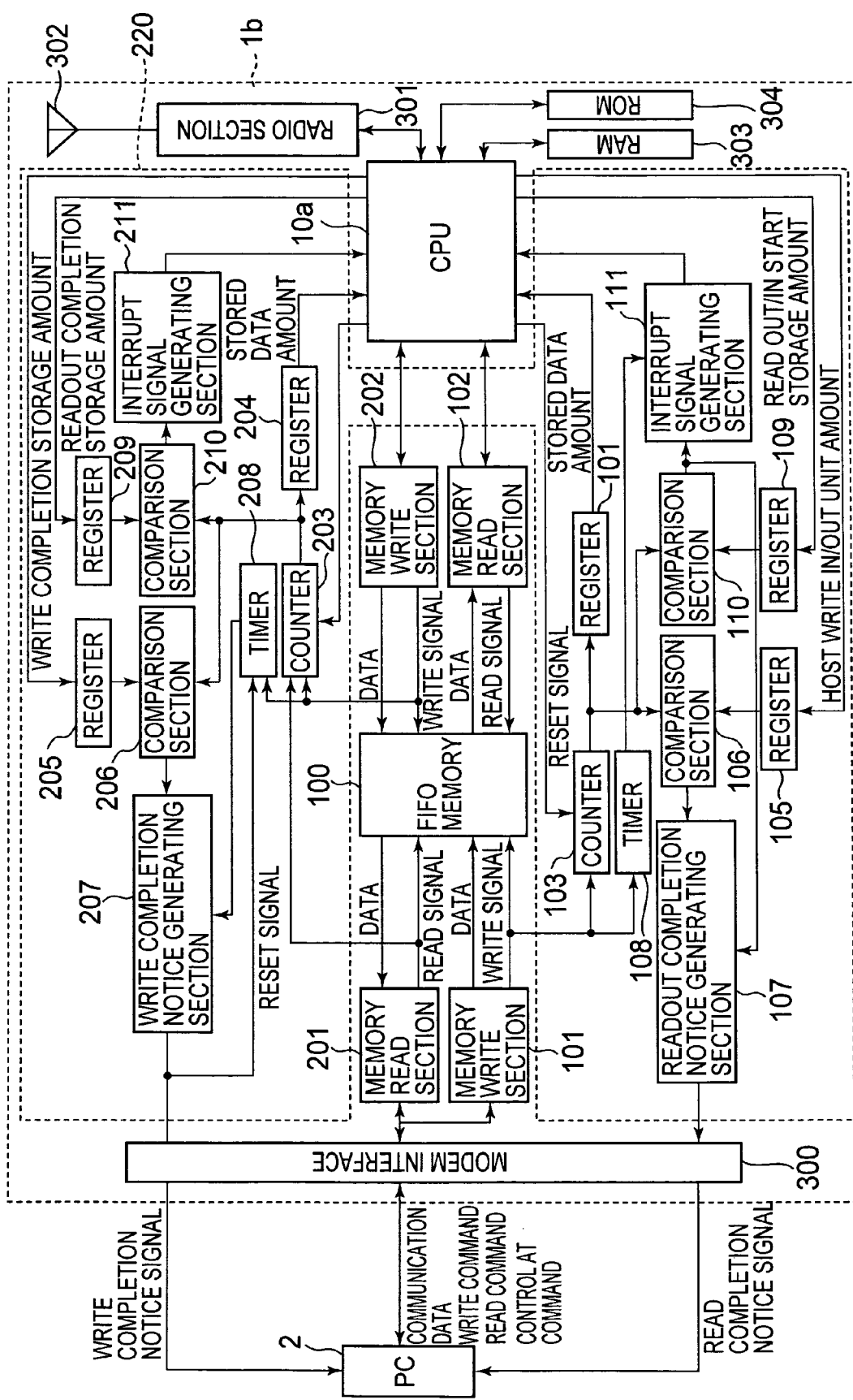
FIG. 8 is a block diagram showing a constitution in a case where the present invention is applied to a radio modem device 1b.

FIG. 8 shows one example. FIG. 8 is a block diagram showing an example in which the memory interface device of the present invention is applied to a radio modem device. An RAM 303 and an ROM 304 are connected to a CPU 10a to input and output data required for a modem operation. A radio modem device 1b of a PC card type or the like exchanges data or various types of commands with the PC 2 via a modem interface 300. Communication data such as packet communication data, a control AT command of the CPU 10a, and a write command and a read command of the FIFO memory 100 are written and read out with respect to the FIFO memory as described in the embodiments of the present invention. The CPU 10a transmits the written communication data to an antenna 302 connected to a radio section 301 in conformity to various types of radio protocols, and the CPU 10a converts, into the communication data, the communication data in conformity to various types of radio protocols received by the radio section 301, and writes the data into the PC 2 via the FIFO memory 100.

INDUSTRIAL APPLICABILITY

According to the present invention, since a readout completion notice signal is generated every write of a predetermined amount unit of data from a memory write unit, it is possible to cope with a memory write procedure in the memory write unit, and it is possible to divert the existing communication control program for the memory write unit (e.g., a host device of a PC card).

Furthermore, since a predetermined amount of or more data is stored in a memory by the memory write procedure, and the data written by the memory write unit can integrally be read out, it is possible to reduce the number of generated interrupt times with respect to a memory readout unit, and it is possible to increase an amount of data to be handled by one interrupt processing by the memory readout unit. As a result, loads due to the interrupt processing can be reduced, and the data can integrally be processed efficiently. In consequence, there is obtained an excellent effect that loads on the memory readout unit (e.g., a CPU of the PC card) are reduced, and a processing speed is enhanced. Even in a case where the data is written from the PC card into the PC, after the write of the predetermined amount unit of the data from a second memory write and readout unit (CPU), a write completion notice signal is generated with respect to a first memory write and readout unit (PC). Therefore, the data written by the second memory write and readout unit can integrally be read out, and processed with good efficiency.

The invention claimed is:

1. A memory interface device for controlling memory access between a memory write unit that writes data into a memory and a memory readout unit that reads the data from the memory, the memory write unit being in compliance with a memory write procedure in which each time data is written into a memory by a predetermined unit amount, it is confirmed that readout of the data from the memory has been completed, and then the next memory write procedure of the data into the memory is performed, the memory interface device comprising:

- write detection means for detecting a memory write procedure in which the memory write unit writes the predetermined unit amount of the data into the memory;
- signal generation means for generating, upon detection of the writing of the predetermined unit amount of the data by the write detection means, a readout completion notice signal that notifies the memory write unit, and thereby confirms, that the readout of the data from the memory by the memory readout unit has been completed so that the memory write unit proceeds to perform a next memory write procedure of the data into the memory;
- data storage amount measurement means for measuring an amount of the data stored in the memory during the memory write procedures;
- memory readout control means for generating an interrupt signal to temporarily stop the generation of the readout completion notice signal by the signal generation means when the stored data amount measured by the data storage amount measurement means reaches a predetermined readout start storage amount, and for outputting the interrupt signal to the memory readout unit so that the memory readout unit reads out all of the data stored in the memory in accordance with the stored data amount measured by the data storage amount measurement means; and
- a timer that counts a period in which writing of the predetermined unit amount of the data into the memory by the memory write unit is discontinued and that outputs a timeout signal to the memory readout control means when a value of the period count reaches a predetermined timer period, the memory readout control means generating and outputting the interrupt signal to the memory readout unit even when the memory readout control means receives the timeout signal output from the timer.

2. A memory interface device for connection to a memory write unit to control a memory access to the memory write unit, the memory write unit being in compliance with a memory write procedure in which each time data is written into a memory by a predetermined unit amount, it is confirmed that readout of the data from the memory has been completed, and then the next memory write procedure of the data into the memory is performed, the memory interface device comprising:

- write detection means for detecting a memory write procedure in which the memory write unit writes the predetermined unit amount of the data into the memory;
- signal generation means for generating, upon detection of the writing of the predetermined unit amount of the data by the write detection means, a readout completion notice signal that notifies the memory write unit, and thereby confirms, that readout of the data from the memory has been completed so that the memory write unit proceeds to perform a next memory write procedure of the data into the memory;
- data storage amount measurement means for measuring an amount of the data stored in the memory during the memory write procedures;
- data processing means for reading the data from the memory and for subjecting the read data to predetermined processing;
- memory readout control means for generating an interrupt signal to temporarily stop the generation of the readout completion notice signal by the signal generation means when the stored data amount measured by the data storage amount measurement means reaches a predetermined readout start storage amount, and for outputting the interrupt signal to the data processing means so that the data processing means reads out all of the data stored in the memory in accordance with the stored data amount measure by the data storage amount measurement means; and
- a timer that counts a period in which writing of the predetermined unit amount of the data into the memory by the memory write unit is discontinued and that outputs a timeout signal to the memory readout control means when a value of the period count reaches a predetermined timer period, the memory readout control means generating and outputting the interrupt signal to the data processing means even when the memory readout control means receives the timeout signal output from the timer.

3. A memory interface method for controlling memory access between a memory write unit that writes data into a memory and a memory readout unit that reads the data from the memory, the memory write unit being in compliance with a memory write procedure in which each time data is written into a memory by a predetermined unit amount, it is confirmed that readout of the data from the memory has been completed, and then the next memory write procedure of the data into the memory is performed, the memory interface method comprising:

- a step of detecting a memory write procedure in which the memory write unit writes the predetermined unit amount of the data into the memory;
- a step of generating, upon detection of the memory write procedure, a readout completion notice signal that notifies the memory write unit, and thereby confirms, that the readout of the data from the memory by the memory readout unit has been completed so that the memory write unit proceeds to perform a next memory write procedure of the data into the memory;
- a step of measuring an amount of the data stored in the memory during the memory write procedures;
- a step of generating an interrupt signal to temporarily stop the generation of the readout completion notice signal when the measured stored data amount reaches a predetermined readout start storage amount, and a step of outputting the interrupt signal to the memory readout unit so that the memory readout unit reads all of the data stored in the memory in accordance with the measured stored data amount;
- a step of counting a period in which writing of the predetermined unit amount of the data is discontinued and a step of outputting timeout signal when a value of the period count reaches a predetermined count period; and
- a step of generating and outputting the interrupt signal to the memory readout unit when a value of the period count reaches a predetermined timer period.

4. A memory interface device for controlling memory access between a first memory write and readout unit and a second memory write and readout unit which write and read data with respect to a memory, the first memory write and readout unit being in compliance with a memory write procedure in which each time data is written into a memory by a predetermined unit amount, it is confirmed that readout of the data from the memory has been completed, and then the next memory write procedure of the data into the memory is performed, the memory interface device comprising:

first write detection means for detecting the write of the predetermined unit amount of the data by the first memory write and readout unit into the memory;

first completion signal generation means for generating, upon detection of the writing of the predetermined unit amount of the data by the first write detection means, a completion signal to notify the first memory write and readout unit that the readout of the data from the memory has been completed;

first data storage amount measurement means for measuring an amount of the data stored in the memory during the memory write procedures;

first memory readout control means for generating an interrupt signal to temporarily stop the signal generation by the first completion signal generation means when the stored data amount in the memory reaches a predetermined readout start storage amount, and for outputting the interrupt signal to the first memory write and readout unit so that the first memory write and readout unit reads out all of the data stored in the memory in accordance with the stored data amount measured by the first data storage amount measurement mean;

second write detection means for detecting the write of the predetermined amount of the data from the second memory write and readout unit into the memory;

second completion signal generation means for generating, upon detection of the writing of the predetermined unit amount of the data by the second write detection means, a completion signal to notify the first memory write and readout unit that the write of the data into the memory has been completed;

second data storage amount measurement means for measurement the stored data amount in the memory during the memory write procedures;

second memory readout control means for generating an interrupt signal with respect to the second memory write and readout unit when the stored data amount in the memory reaches a predetermined readout completion storage amount; and a first timer that counts a period in which writing of the predetermined unit amount of the data into the memory by the memory write unit is discontinued and that outputs a timeout signal to the first memory readout control means when a value of the period count reaches a predetermined timer period, the first memory readout control means generating the interrupt signal with respect to the second memory write and readout unit even when the first memory readout control means receives the timeout signal output from the first timer.

5. A memory interface device according to claim 4; further comprising a second timer that counts a period in which the write of the data from the second memory write and readout unit into the memory is discontinued when a value of the period count reaches a predetermined timer period, the second timer outputting a timeout signal to the second completion signal generation means; and wherein the second completion signal generation means generates a completion notice signal with respect to the first memory write and readout unit upon receipt of the timeout signal.

6. A memory interface method for controlling memory access between a first memory write and readout unit and a second memory write and readout unit which write and read data with respect to a memory, the first memory write and readout unit being in compliance with a memory write procedure in which each time data is written into a memory by a predetermined unit amount, it is confirmed that readout of the data from the memory has been completed, and then the next memory write procedure of the data into the memory is performed, the memory interface method comprising:

a step of detecting the write of the predetermined unit amount of the data from the first memory write and readout unit into the memory;

a step of notifying the first memory write and readout unit, upon detection of the predetermined unit amount of the data, that the readout of the data from the memory has been completed;

a step of measuring an amount of the data stored in the memory as a result of the detected write of the predetermined unit amount of data from the first memory write and readout unit into the memory;

a step of generating an interrupt signal with respect to the first memory write and readout unit to temporarily stop notification to the first memory write and readout unit of the completion of the readout of the data from the memory when the measured stored data amount in the memory reaches a predetermined readout start storage amount, and a step of outputting the interrupt signal to the first memory write and readout unit so that the first memory write and readout unit reads out all of the data stored in the memory in accordance with the measured stored data amount;

a step of detecting the write of the predetermined unit amount of the data from the second memory write and readout unit into the memory;

a step of generating a signal, upon detection of the writing of the predetermined unit amount of data, to notify the first memory write and readout unit that the write of the data into the memory has been completed;

a step of measuring the stored data amount in the memory as a result of the detected writing of the predetermined unit amount of data from the second memory write and readout unit into the memory;

a step of generating an interrupt signal with respect to the second memory write and readout unit when the stored data amount in the memory reaches a predetermined readout completion storage amount;

a step of counting a period in which the write of the predetermined unit amount of the data is discontinued; and a step of generating the interrupt signal with respect to the second memory write and readout unit when the a value of the period count reaches a predetermined timer period.

7. A memory interface method according to claim 6; further comprising: a step of counting a period in which the write of the data from the second memory write and readout unit into the memory is discontinued; a step of outputting a timeout signal when a value of the period count reaches the predetermined timer period; and a step of outputting a completion signal to the first memory write and readout unit in response to the timeout signal.

8. A modem device for connection to a data processing unit that complies with a memory write procedure in which each time communication data or control command data is written into a memory by a predetermined unit amount, it is confirmed that readout of the data from the memory has been completed, and then the next write of the data into the memory is performed, the modem device comprising:

a modem interface that exchanges communication data or control command data with respect to the data processing unit;

a memory into which the communication data or control command data is written;

a memory readout unit that reads the communication data or control command data from the memory;

communication means connected to the memory readout unit to transmit and receive the communication data or the control command data;

write detection means for detecting the write of the predetermined unit amount of the communication data or the control command data from the data processing unit into the memory;

signal generation means for generating, upon detection of the writing of the predetermined unit amount of the communication data or the control command data, a readout completion notice signal that notifies the data processing unit, and thereby confirms, that the read out of the communication data or the control command data from the memory has been completed so that the data processing unit proceeds to perform a next write procedure into the memory;

data storage amount measurement means for measuring an amount of the communication data or the control command data stored in the memory;

memory readout control means for generating an interrupt signal to temporarily stop the generation of the readout completion notice signal when the stored data amount in the memory reaches a predetermined readout start storage amount, and for outputting the interrupt signal to the memory readout unit so that the memory readout unit reads out all of the data stored in the memory in accordance with the stored data mount measured by the data storage amount measurement means; and counting means for counting a period in which writing of the predetermined unit amount of the data into the memory is discontinued and for outputting a timeout signal to the memory readout control means when a predetermined value of the period count is reached, the memory readout control means generating and outputting the interrupt signal to the memory readout unit even when the memory readout control means receives the timeout signal.

\* \* \* \* \*